US009851847B2

United States Patent
Innami et al.

(10) Patent No.: US 9,851,847 B2
(45) Date of Patent: Dec. 26, 2017

(54) TOUCH PANEL INPUT ITEM CORRECTION IN ACCORDANCE WITH ANGLE OF DEVIATION

(71) Applicant: International Business Machines Corporation, Armonk, NY (US)

(72) Inventors: Satoshi Innami, Tokyo (JP); Keisuke Kamada, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/419,448

(22) Filed: Jan. 30, 2017

(65) Prior Publication Data

US 2017/0139542 A1 May 18, 2017

Related U.S. Application Data

(63) Continuation of application No. 14/725,321, filed on May 29, 2015.

(30) Foreign Application Priority Data

Jun. 20, 2014 (JP) .................................. 2014-127112

(51) Int. Cl.
  *G06F 3/048* (2013.01)
  *G06F 3/041* (2006.01)
  (Continued)

(52) U.S. Cl.
  CPC .......... *G06F 3/0418* (2013.01); *G06F 3/0488* (2013.01); *G06F 3/04845* (2013.01); *G06F 3/04886* (2013.01); *G06F 3/04883* (2013.01)

(58) Field of Classification Search
  CPC .... G06F 3/041; G06F 3/0488; G06F 3/04883; G06F 3/04886; H04M 1/00
  See application file for complete search history.

(56) References Cited

U.S. PATENT DOCUMENTS 5,689,667 A * 11/1997 Kurtenbach .......... G06F 3/0482
 715/810
8,276,100 B2 * 9/2012 Nagai ................. G06F 3/04812
 715/856
(Continued)

FOREIGN PATENT DOCUMENTS

JP 2005512241 A 4/2005
JP 2010146032 A 7/2010
(Continued)

OTHER PUBLICATIONS

Inami et al., "Information Processing, Device, Program, and Method", Japan Patent Application 2014-127112 (English Translation), filed Jun. 20, 2014, pp. 1-42.

(Continued)

*Primary Examiner* — Dino Kujundzic
(74) *Attorney, Agent, or Firm* — Stosch Sabo

(57) ABSTRACT

An information processing device for receiving user selections inputted using a touch panel includes an acquisition unit for acquiring a touch point on the touch panel touched by the user, a placement unit for placing, in an area surrounding a display reference point on a screen, the display of a plurality of input items capable of being inputted by the user by moving the touch point, a detection unit for detecting the direction of movement by the touch point from the initial touch point of the user, a calculation unit for calculating the angle of deviation between the direction of movement of the touch point by the user and a standard direction, and a correction unit for correcting the placement of the display of the plurality of input items in accordance with the angle of deviation.

7 Claims, 17 Drawing Sheets

(51) Int. Cl.
*G06F 3/0488* (2013.01)
*G06F 3/0484* (2013.01)

(56) References Cited

U.S. PATENT DOCUMENTS

| | | | | |
|---|---|---|---|---|
| 2007/0180392 | A1* | 8/2007 | Russo | G06F 3/0482 715/765 |
| 2007/0300182 | A1* | 12/2007 | Bilow | G06F 3/0425 715/799 |
| 2010/0053109 | A1* | 3/2010 | Narita | G06F 3/042 345/173 |
| 2011/0016390 | A1* | 1/2011 | Oh | G06F 3/0482 715/702 |
| 2012/0001858 | A1* | 1/2012 | Matsuda | G06F 3/0482 345/173 |
| 2015/0370414 | A1 | 12/2015 | Innami et al. | |

FOREIGN PATENT DOCUMENTS

| | | |
|---|---|---|
| JP | 2012099118 A | 5/2012 |
| JP | 2012155675 A | 8/2012 |
| JP | 2012168939 A | 9/2012 |
| JP | 2013020332 A | 1/2013 |
| JP | 2013235523 A | 11/2013 |
| JP | 2014045387 A | 3/2014 |
| JP | 2014048721 A | 3/2014 |
| JP | 2014052817 A | 3/2014 |

OTHER PUBLICATIONS

Decision to Grant a Patent, Application No. 2014-127112, Jun. 7, 2016, Translated Sep. 21, 2016. 6 pages.
JP Office Action; Notification for Refusal, Application No. 2014-127112, May 12, 2016, Translated Sep. 21, 2016. 6 pages.
List of IBM Patents or Patent Applications Treated as Related, Jan. 27, 2017. 2 pages.

* cited by examiner

TOUCH PANEL INPUT ITEM CORRECTION IN ACCORDANCE WITH ANGLE OF DEVIATION

BACKGROUND OF THE INVENTION

The present invention relates to an information processing device, program, and method.

Information processing devices are known in which an input item is selected and inputted using a touch panel from among a plurality of input items such as alphanumeric characters displayed on a screen.

SUMMARY

A first aspect of the present invention is an information processing device that receives user selections inputted using a touch panel, said device including: an acquisition unit for acquiring a touch point on the touch panel touched by the user; a placement unit for placing, in an area surrounding a display reference point on a screen, the display of a plurality of input items capable of being inputted by the user by moving the touch point; a detection unit for detecting the direction of movement by the touch point from the initial touch point of the user; a calculation unit for calculating the angle of deviation between the direction of movement of the touch point by the user and a standard direction; and a correction unit for correcting the placement of the display of the plurality of input items in accordance with the angle of deviation.

This summary of the present invention is not intended to enumerate all of the required characteristics of the present invention. The present invention may be realized by any combination or sub-combination of these characteristics.

DETAILED DESCRIPTION

The following is an explanation of the present invention with reference to an embodiment of the present invention. However, the present embodiment does not limit the present invention in the scope of the claims. Also, all combinations of characteristics explained in the embodiment are not necessarily required in the technical solution of the present invention.

Figure 1:
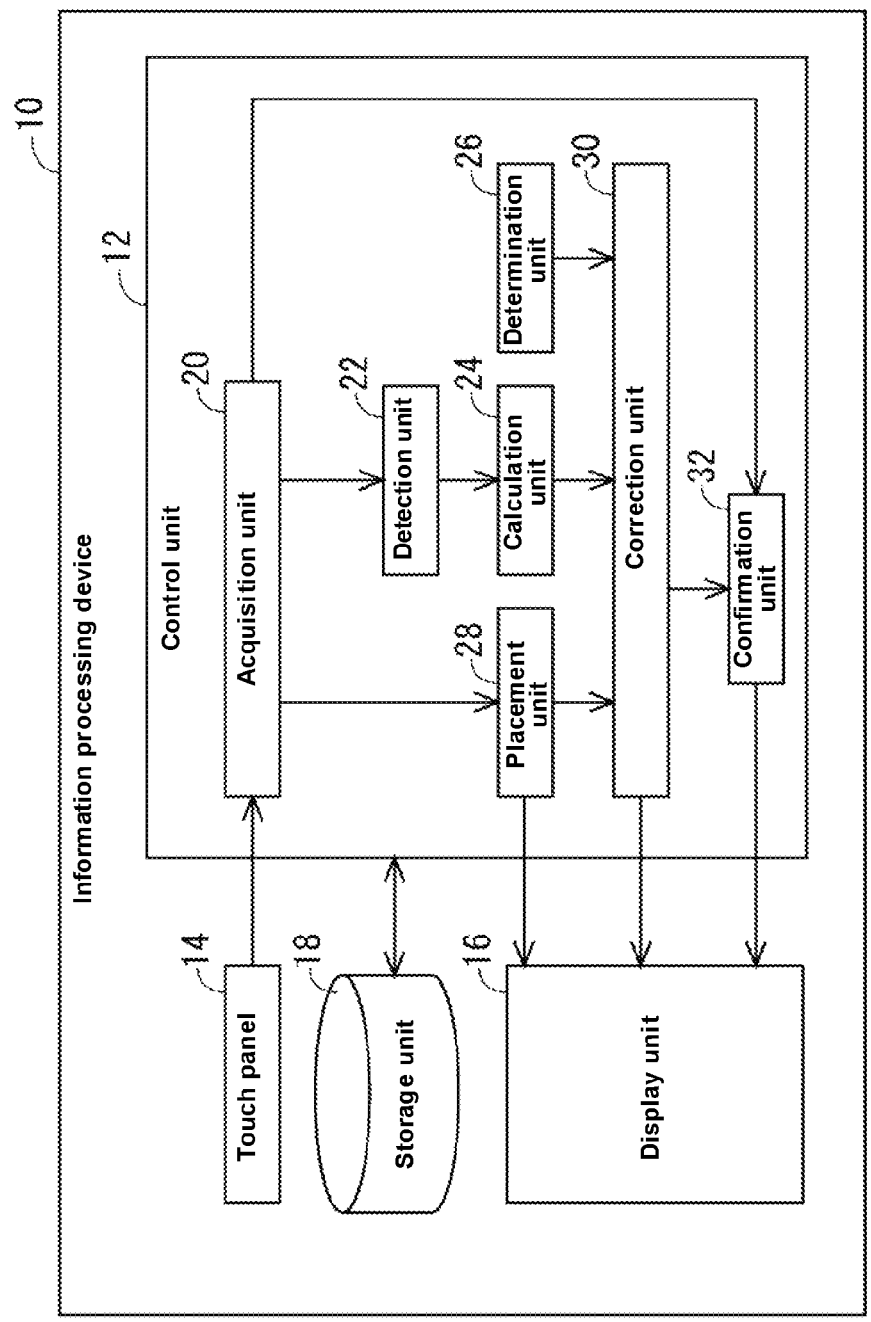
FIG. 1 is a configuration example of the entire information processing device 10.

FIG. 1 is a configuration example of the entire information processing device 10. The information processing device 10 receives user selections inputted using a touch panel 14. The information processing device 10 is able to display a plurality of input items such as alphanumeric characters around a display reference point, and allow input using movement from a touch point (for example, a "flick"). The information processing device 10 minimizes mistaken input by the user by correcting the placement of the display of the plurality of input items in accordance with the angle of deviation between the direction of movement of the touch point by the user and a standard direction. As shown in FIG. 1, the information processing device 10 includes a control unit 12, a touch panel 14, a display unit 16, and a storage unit 18. An example of an information processing device 10 is a computer such as a smartphone.

An example of a control unit 12 is a processing device such as a central processing unit (CPU). The control unit 12 has an acquisition unit 20, a detection unit 22, a calculation unit 24, a determination unit 26, a placement unit 28, a correction unit 30, and a confirmation unit 32. The control unit 12 functions as the acquisition unit 20, detection unit 22, calculation unit 24, determination unit 26, placement unit 28, correction unit 30, and confirmation unit 32 by reading a program stored in the storage unit 18. Some or all of the units among the acquisition unit 20, detection unit 22, calculation unit 24, determination unit 26, placement unit 28, correction unit 30, and confirmation unit 32 may be configured using hardware circuits.

The acquisition unit 20 acquires position information related to the position of the touch point TP touched by the user on the touch panel 14. The acquisition unit 20 outputs the position information on the touch point to the detection unit 22, the placement unit 28, and the confirmation unit 32.

The detection unit 22 detects the direction of movement of the touch point by the user from the initial touch point TP. For example, the detection unit 22 detects the direction of movement of the touch point by the user from the difference between the position information for the initial touch point TP acquired by the acquisition unit 20 and the position information for the latest touch point TP. The detection unit 22 outputs the detected direction of movement for the touch point to the calculation unit 24.

The calculation unit 24 calculates the angle of deviation between the direction of movement of the touch point TP by the user and a predetermined standard direction. For example, the calculation unit 24 calculates, as the angle of deviation, the angle between the movement direction of the touch point TP acquired from the detection unit 22 and predetermined standard directions SDn (n=1, 2, etc.) stored in the storage unit 18. For example, the standard direction SD is the direction referenced when selecting input items. Whenever a particular standard direction does not have to be referenced herein, the standard direction is simply denoted by the reference symbol SD. The calculation unit 24 outputs the calculated angle of deviation DA to the correction unit 30.

The determination unit 26 determines whether the screen has been touched with the left hand or the right hand of the user. The determination unit 26, for example, may determine whether the screen has been touched with the left hand or the right hand of the user using a known method (such as the method disclosed in Laid-open Patent Publication No. 2013-122711). More specifically, the determination unit 26 can determine the hand using the position of the user's thumb and index finger on the case, and the direction of rotation of the information processing device 10. In addition, the case may be equipped with contact sensors, and the determination unit 26 may then determine whether the user's left hand or right hand is holding the device based on the location of the contact sensors making contact with the user's fingers. The determination unit 26 may also determine whether the user's left hand or right hand is holding the device using left hand or right hand information inputted by the user. The determination unit 26 may also determine whether the user's left hand or right hand is holding the device on the basis of the shape of the finger touching the touch panel 14, specifically the vertical inclination of the finger. The determination unit 26 outputs the results of determining whether the user's left hand or right hand is holding the device to the correction unit 30.

The placement unit 28 places the display of the plurality of input items which can be inputted by movement of the user's touch point TP around a display reference point on the screen of the display unit 16. For example, the placement unit 28 may associate the display reference point with the position information of the initial touch point TP of the user acquired by the acquisition unit 20. The placement unit 28 may also place the display reference point at a position that is a predetermined distance above the initial touch point TP. The placement unit 28 may also fix the display reference point at a location unrelated to the touch point. The placement unit 28 outputs information related to the placement location of the plurality of input items to the correction unit 30, and displays the plurality of input items on the display unit 16.

Using the initial touch point TP as a reference point, the placement unit 28 also assigns determination zones JAn (n=0, 1, 2, etc.) to the plurality of input items in order to determine whether a given input item has been selected. Whenever it is not necessary to reference a particular determination herein, the determination zone is simply denoted by the reference symbol JA. The placement unit 28 allocates at least one determination zone JA0 to the input item in the middle of a central circle centered on the position information for the initial touch point TP acquired by the acquisition unit 20. The determination zones JA used to enter input items may conform to the shape of the buttons displayed on the display unit 16. For example, the determination zones may be rectangular. The placement unit 28 then allocates to the input items as determination zones JA different angle ranges centered on the touch point TP outside of determination zone JA0. The placement unit 28 calculates the size of the angle ranges in accordance with the number of surrounding determination zones JA based on the equation: Size of angle ranges=360/(number of surrounding determination zones JA).

Thus, the size of the angle ranges is 90° when there are four surrounding determination zones JA. The placement unit 28 outputs to the correction unit 30 information related to the central determination zone JA and information related to the angle ranges of the allocated determination zones JA.

The correction unit 30 corrects the placement of the input items on the screen in accordance with the angle of deviation DA. For example, the correction unit 30 rotates the display of the input items around a display reference point on the basis of the angle of deviation DA obtained from the calculation unit 24 and displays the input items on the display unit 16. For example, the correction unit 30 rotates the display on the display unit 16 in a predetermined direction of rotation and within a predetermined angle range from the reference position for display of the input items as described in greater detail below. An example of a predetermined angle range is ½ the size of the angle range indicated in the equation above. An example of a predetermined direction of rotation is to the right when the holding hand and touching hand is the left hand, and to the left when the holding hand and the touching hand is the right hand.

The correction unit 30 also rotates the positions of the determination zones JA around the initial touch point TP on the basis of the result of the determination unit 26 determining whether the user's hand touching the screen is the left hand or the right hand. The correction unit 30 rotates the determination zones JA to the left when the screen is touched by the user's right hand, and rotates the determination zones JA to the right when the screen is touched by the user's left hand. This is done because, for example, when the information processing device 10 is being held only by the user's left hand and the user's left thumb touches the touch panel 14, the thumb often moves upward at a right angle when the user moves it upward. The correction unit 30 determines the angle of rotation RA for rotating the placement of the determination zones JA in accordance with the angle ranges of the surrounding determination zones JA. For example, the correction unit 30 calculates the angle of rotation RA on the basis of the equation: Angle of rotation RA=size of the angle ranges/(number of surrounding determination zones JA).

When the information processing device 10 is being held in one of the user's hands, this angle of rotation RA is applicable in situations where the information processing device 10 is being held downward at an angle and in situations where the information processing device 10 is being held on the side. The correction unit 30 outputs information on the determination zones JA to the confirmation unit 32 whether or not the areas have been corrected.

The confirmation unit 32 confirms the user designated input items, and the confirmed input items are displayed on the display unit 16. For example, the confirmation unit 32 confirms the user designated input items based on the position information of the user's touch point acquired by the acquisition unit 20, and information on the determination zones JA acquired from the correction unit 30.

The touch panel 14 is provided on the front surface of the display unit 16 facing the user. The touch panel 14 may be provided in another position on the display unit 16 if necessary. The touch panel 14 detects the touch of a user. The touch panel 14 outputs the coordinates of detected user touch points to the acquisition unit 20.

The display unit 16 displays images inputted from the control unit 12. For example, the display unit 16 displays a screen for activating the input items obtained from the placement unit 28, the correction unit 30, and the confirmation unit 32.

The storage unit 18 is connected to the control unit 12. The storage unit 18 stores information inputted from the control unit 12, and outputs stored information in response to a request from the control unit 12. For example, the storage unit 18 stores programs executed by the control unit 12 and parameters needed to execute the programs.

Figure 2:
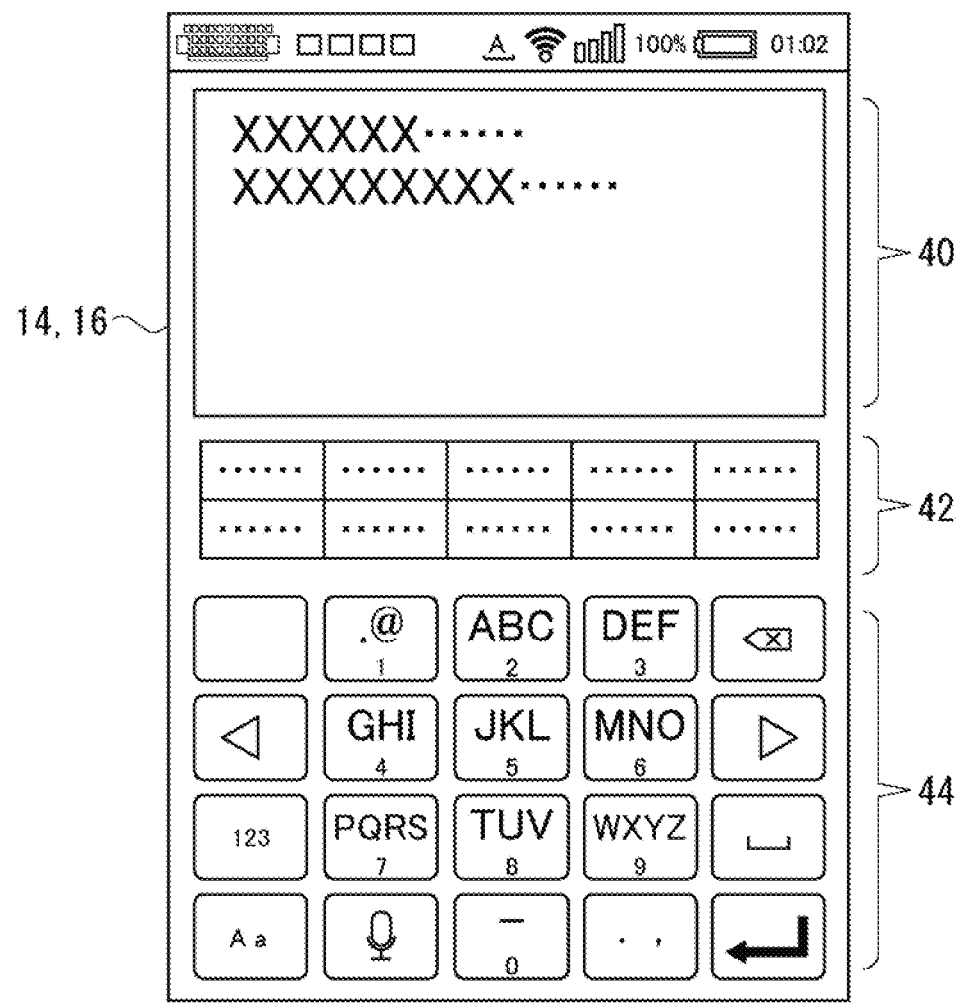
FIG. 2 is an example of a screen displayed on the display unit 16 for inputting alphanumeric characters.

FIG. 2 is an example of a screen displayed on the display unit 16 for inputting alphanumeric characters as input items. As shown in FIG. 2, the screen created by the placement unit 28 to enable selection of the input items displayed on the display unit 16 includes an input area 40, a candidate area 42, and a selection area 44. Inputted characters selected by the user are displayed in the input area 40. The characters displayed in the input area 40 can be, for example, the text in an email message. The candidate area 42 displays candidates predicted from the input of characters. The selection area 44 includes a plurality of button-shaped areas for selecting input items. For example, when the button area displaying "PQRS 7" is touched, any one of the characters in "PQRS 7" can be selected and inputted as an input item.

Figure 3:
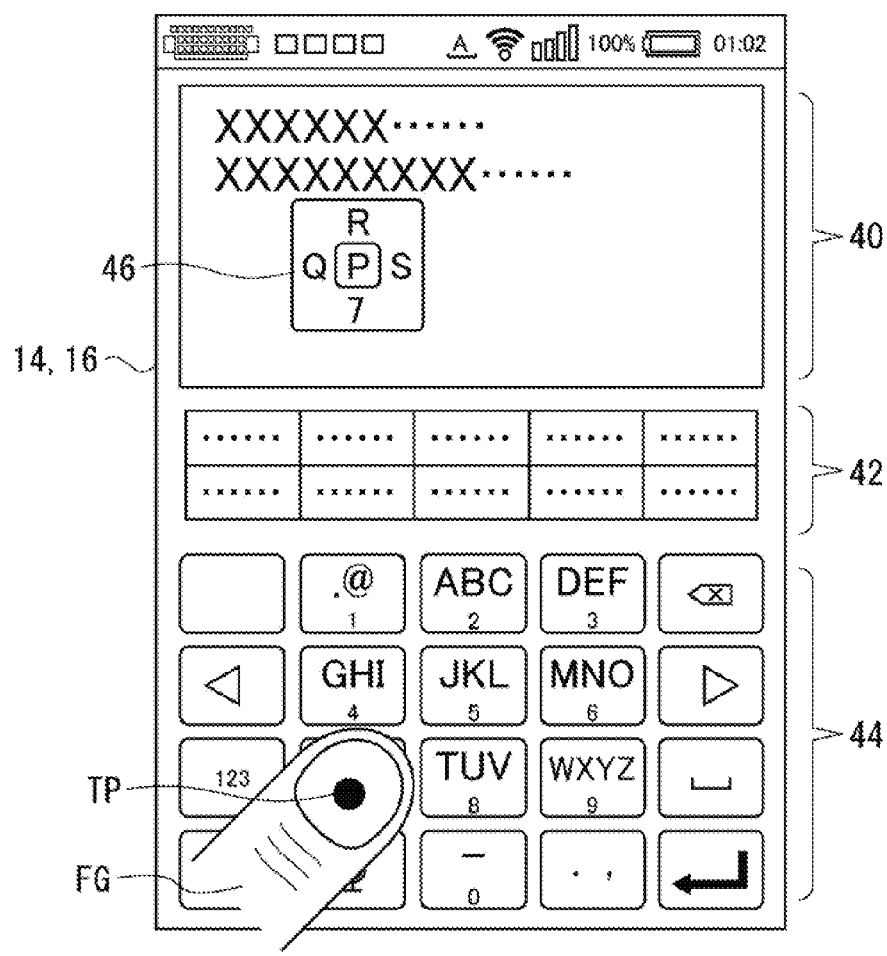
FIG. 3 is a diagram used to explain the selection of the first input item during alphanumeric character input.
Figure 4:
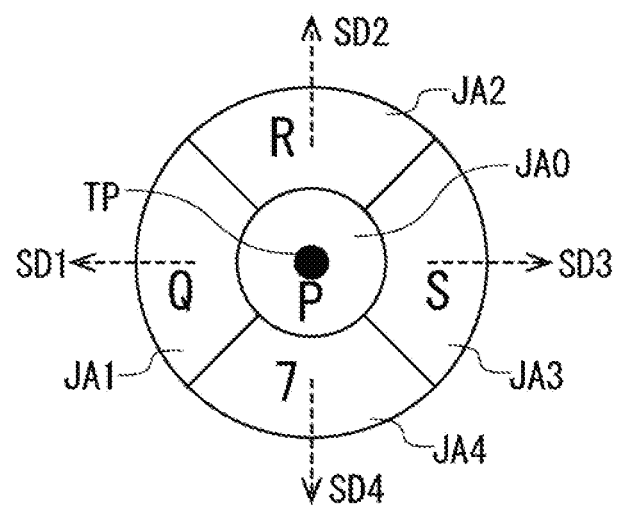
FIG. 4 is a diagram used to explain the relationship between the touch point TP and the determination zones JA in FIG. 3.

FIG. 3 is a diagram used to explain the selection of the first input item during alphanumeric character input. FIG. 4 is a diagram used to explain the relationship between the touch point TP and the determination zones JA in FIG. 3. One example of a first input item is a letter group including a plurality of letters. As shown in FIG. 3, when it has been determined that the initial touch point TP of the user's finger FG is in the area displaying "PQRS 7" on the screen of the display unit 16, the placement unit 28 displays on the display unit 16, as the input item display 46, a grouping with the five alphanumeric characters "P", "Q", "R", "S" and "7" as input items. For example, the placement unit 28 places the input item display 46 so that the center line of the input item display 46 is aligned with a predetermined reference point. The predetermined reference point in FIG. 3 is a predetermined distance above the initial touch point TP. In the input item display 46, the placement unit 28 places "P" in the center, "Q" to the left of "P", "R" above "P", "S" to the right of "P", and "7" below "P". When the initial input item display 46 has been displayed, the placement unit 28 highlights "P" by surrounding the letter with a square to indicate that the letter "P" in the center of the display is the currently selected input item. The multiple input item display 46 shown in FIG. 3 is at the reference position for the uncorrected display 46.

As shown in FIG. 4, the placement unit 28 allots determination zones JA around the user's initial touch point TP which is indicated by the black dot. More specifically, the placement unit 28 allocates the circle centered on the initial touch point TP as the determination zone JA0 for letter "P". The placement unit 28 establishes a standard direction SD for each of the remaining input items in reference to the initial touch point TP. For example, when there are four remaining input items for the alphanumeric characters "Q", "R", "S" and "7", the placement unit 28 establishes reference directions SD every 90° (=360/4). The placement unit 28 establishes one of the standard directions SD in the upward direction. In the example shown in FIG. 4, the placement unit 28 establishes standard direction SD2 above the letter "R". Then, the placement unit 28 establishes standard direction SD1 to the left of letter "Q", standard direction SD3 to the right of letter "S", and standard direction SD4 below the number "7". The placement unit 28 allocates, as the angle range for each input item, the range rotated at a 45° (=½ of the size of the angle ranges) to the right and left of each standard direction SD. In other words, the placement unit 28 allocates, as determination zones JAn (n=1, 2, 3, 4) for input items "Q", "R", "S" and "7", angle areas divided by the fan-shaped boundary lines placed on the outside of the center circle in FIG. 4.

Figure 5:
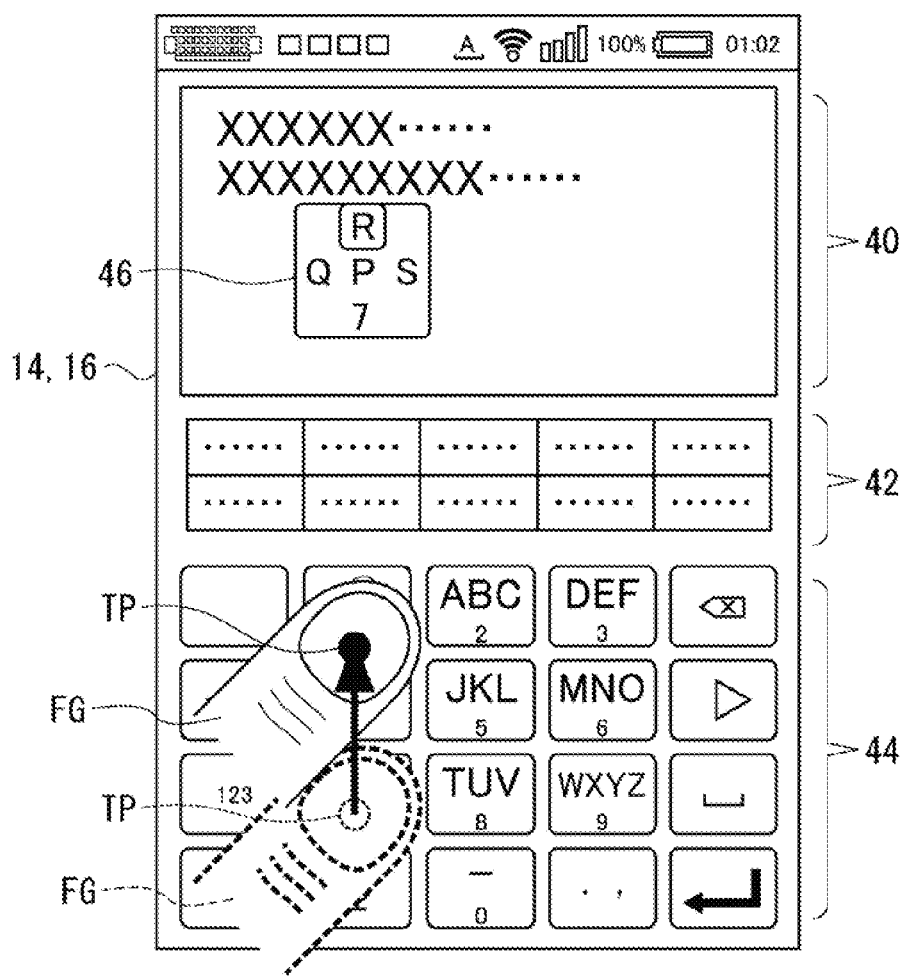
FIG. 5 is a diagram used to explain the selection of the second input item after the first input item has been selected during alphanumeric character input.
Figure 6:
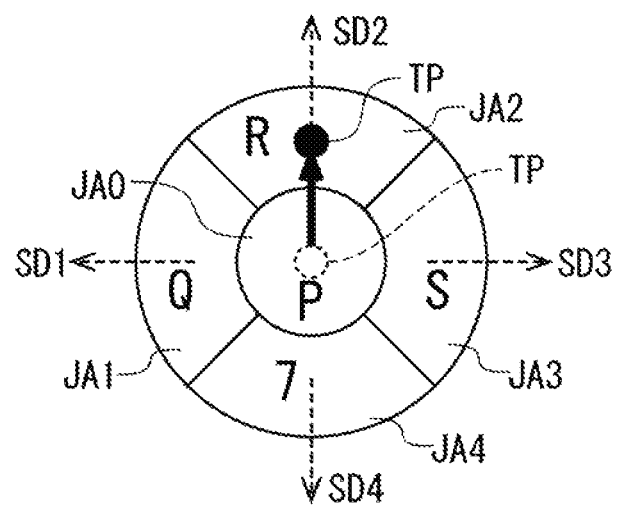
FIG. 6 is a diagram used to explain the relationship between movement of the touch point TP and the determination zone JA in FIG. 5.

FIG. 5 is a diagram used to explain the selection of the second input item after the first input item has been selected during alphanumeric character input. FIG. 6 is a diagram used to explain the relationship between movement of the touch point TP and the determination zone JA in FIG. 5. The example of the second input item is a single letter selected from the grouping of alphanumeric characters in the first input item. In the example shown in FIG. 5, the correction unit 30 has not corrected either the input item display 46 or the determination zones JA. The user touches the touch panel 14 with a finger FG, and moves the finger upward along the thick arrow from the position of the finger FG indicated by the dotted circle in FIG. 5 to the position of the finger FG indicated by the solid circle.

As shown in FIG. 6, the confirmation unit 32 determines that the touch point TP has left the determination zone JA0 of the letter "P" and moved to a touch point TP in the determination zone JA2 for the letter "R", and determines that the user is currently selecting the letter "R" as the input item. In this situation, the confirmation unit 32 indicates to the user that the letter "R" is the currently selected input item in the input item display 46 by surrounding the letter with a square.

Figure 7:
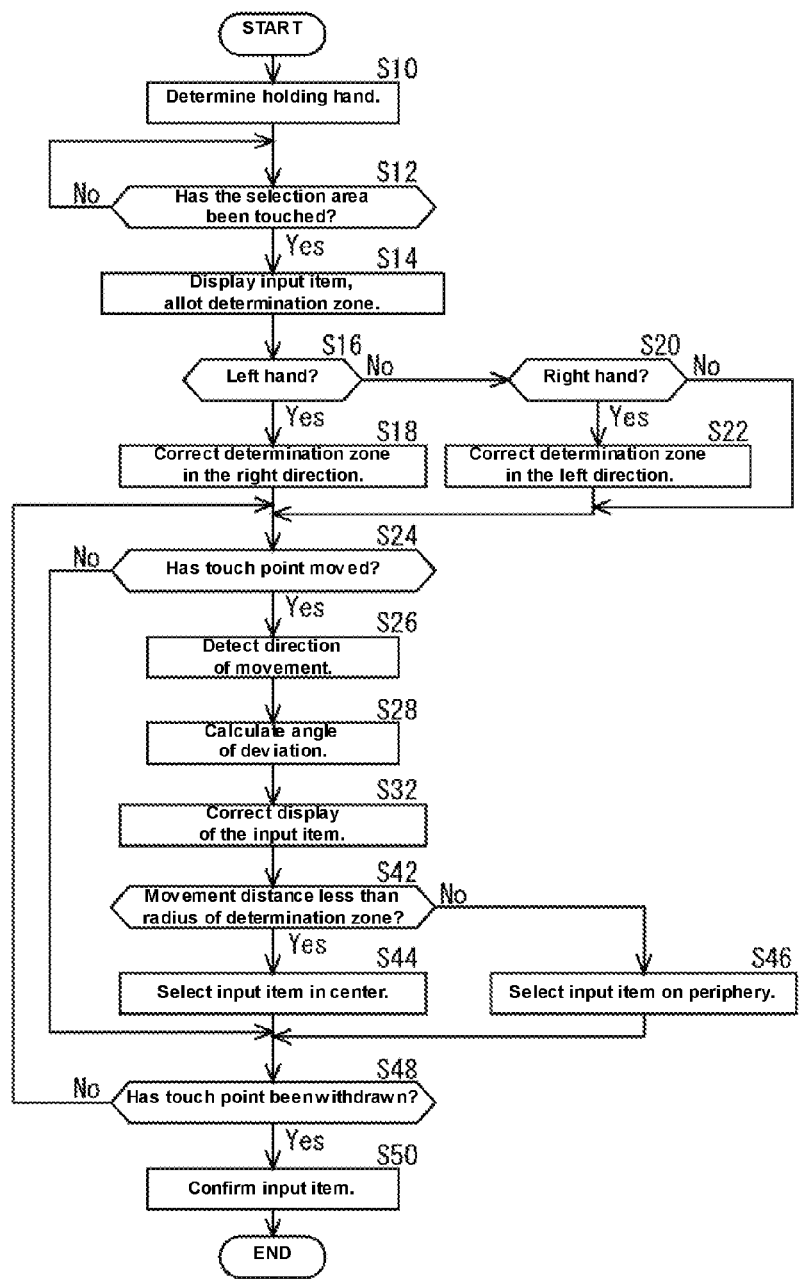
FIG. 7 is a flowchart of the input processing performed on the input items by the control unit 12.
Figure 8:
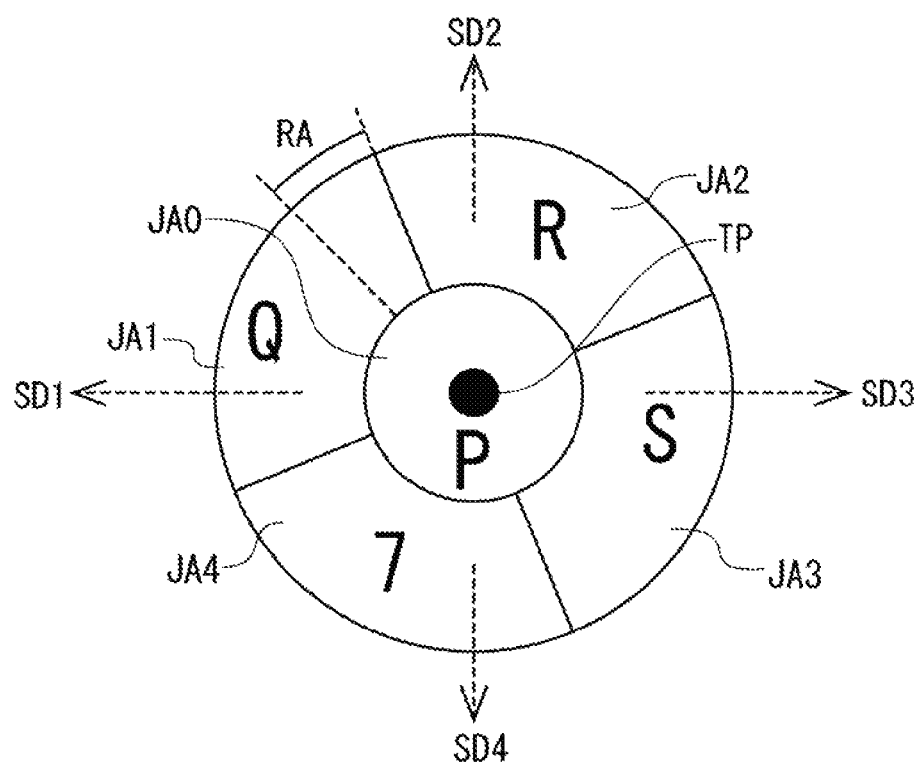
FIG. 8 is a diagram of the corrected determination zones JA.
Figure 9:
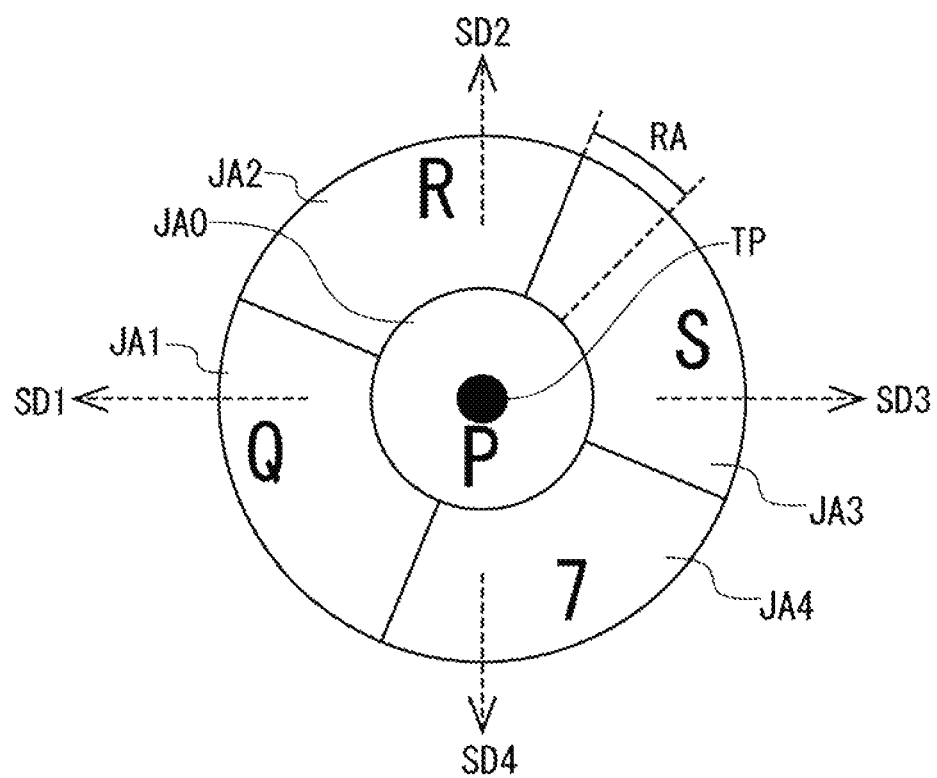
FIG. 9 is a diagram of the corrected determination zones JA.
Figure 10:
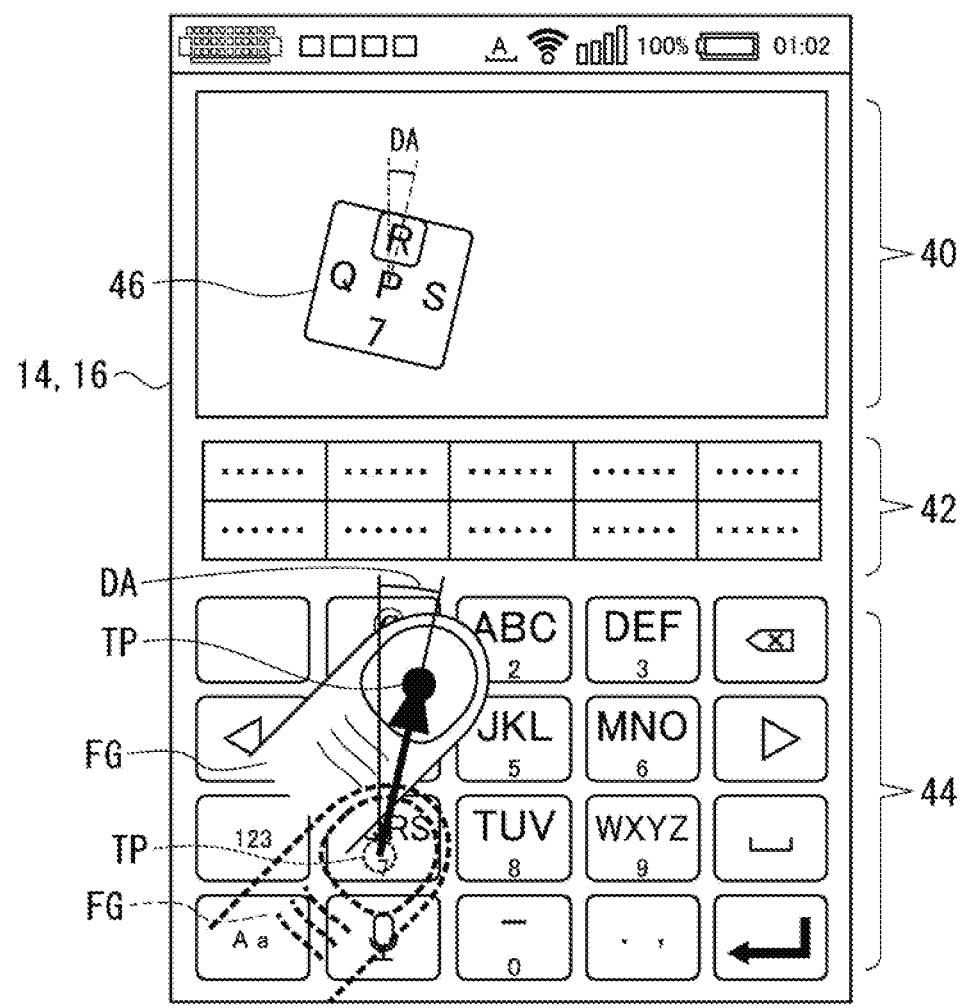
FIG. 10 is a diagram showing the corrected input item display 46.
Figure 11:
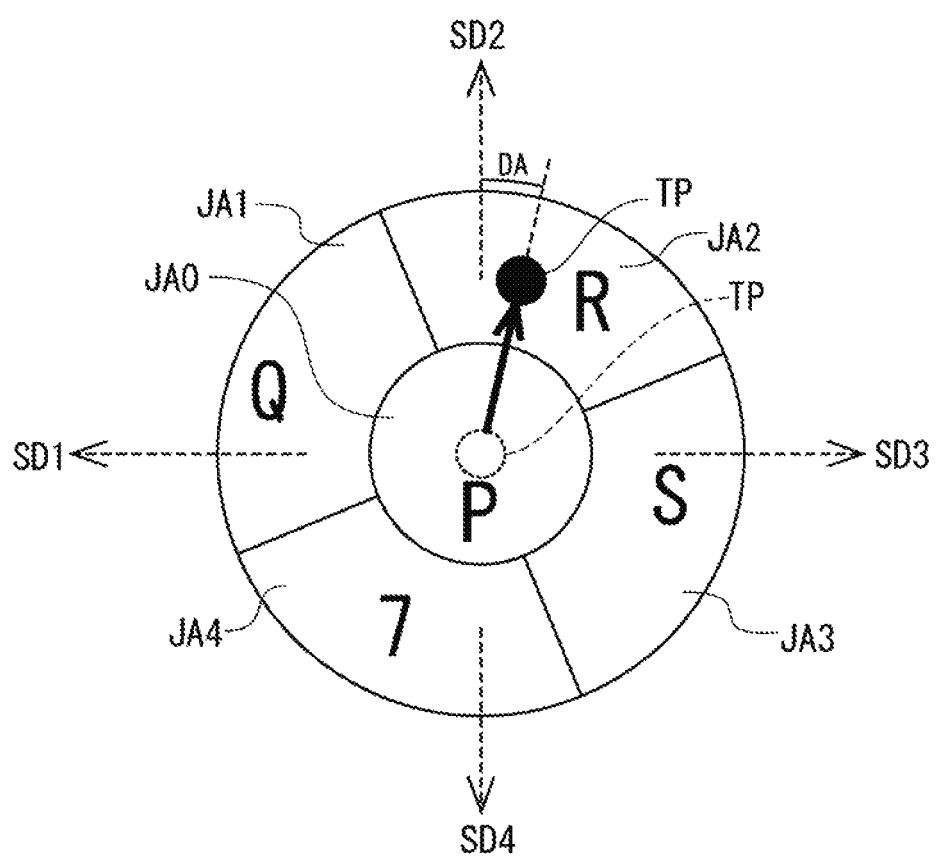
FIG. 11 is a diagram of the determination zone JA in FIG. 10.
Figure 12:
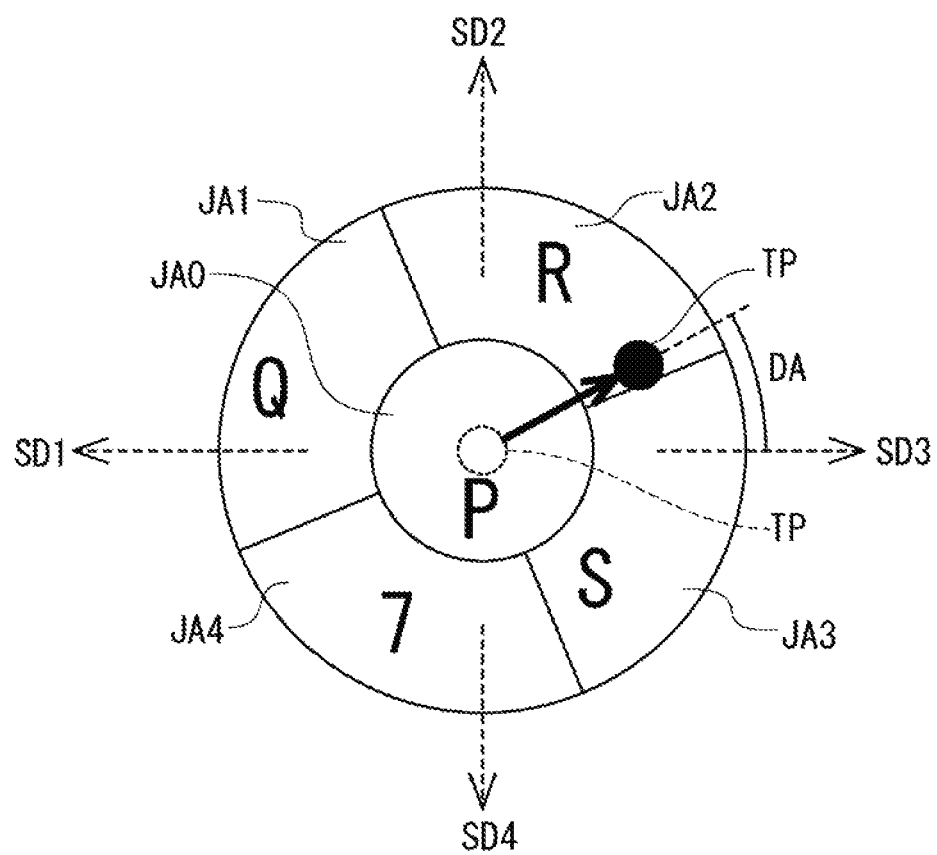
FIG. 12 is a diagram of the determination zones JA used to explain correction of the input item display 46.
Figure 13:
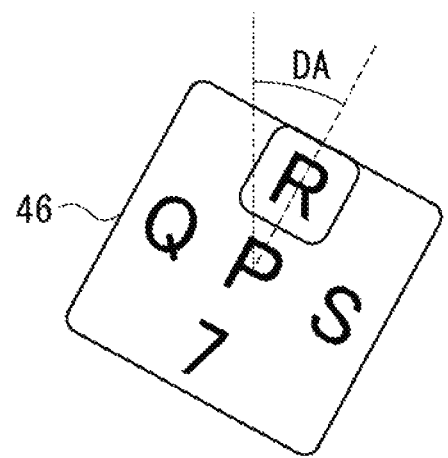
FIG. 13 is a diagram of the display 46 used to correct the input item display 46.
Figure 14:
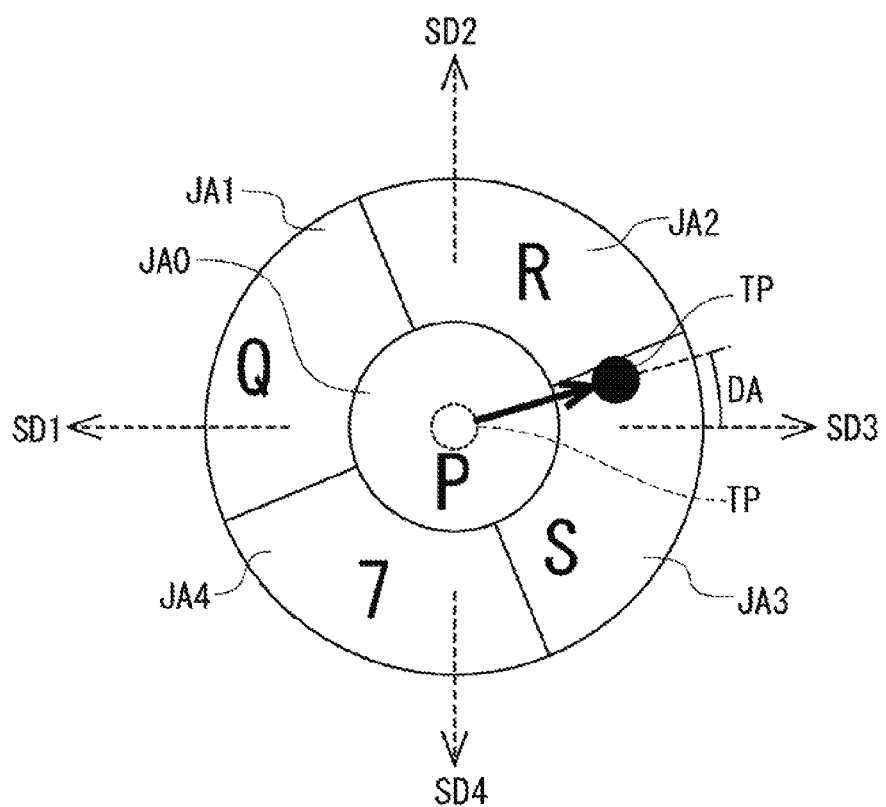
FIG. 14 is a diagram of the determination zones JA used to explain correction of the input item display 46.
Figure 15:
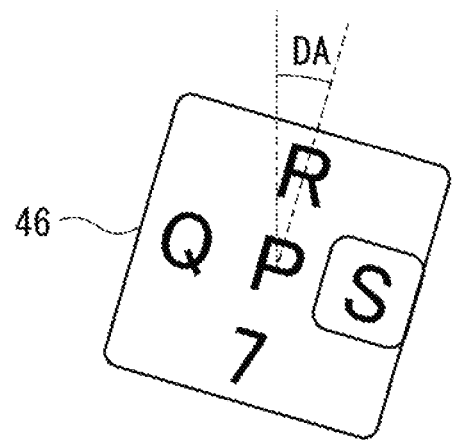
FIG. 15 is a diagram of the display 46 used to correct the input item display 46.

FIG. 7 is a flowchart of the input processing performed on the input items by the control unit 12. FIG. 8 and FIG. 9 are diagrams of the corrected determination zones JA. FIG. 10 is a diagram showing the corrected input item display 46. FIG. 11 is a diagram of the determination zone JA in FIG. 10. FIG. 12 is a diagram of the determination zones JA used to explain correction of the input item display 46. FIG. 13 is a diagram of the display 46 used to correct the input item display 46. FIG. 14 is a diagram of the determination zones JA used to explain correction of the input item display 46. FIG. 15 is a diagram of the display 46 used to correct the input item display 46. When the input processing for input items begins, the screen shown in FIG. 2 is displayed on the display unit 16.

As shown in FIG. 7, the determination unit 26 determines whether the user's hand holding the information processing device 10 is the left hand or the right hand (S10). The determination unit 26 outputs the result to the correction unit 30.

The acquisition unit 20 determines, based on the position information of the user's touch point TP obtained from the touch panel 14, whether or not the user has touched the selection area 44 of the touch panel 14 (S12). The acquisition unit 20 remains in standby mode until it has determined that the user has touched the selection area 44 (S12: No). When the user, as shown in FIG. 3, has touched the area displaying "PQRS 7", the acquisition unit 20 determines that the user has touched the selection area 44 (S12: Yes), and outputs the position information for the initial touch point TP to the detection unit 22, the placement unit 28, and the confirmation unit 32.

When the position information for the initial touch point TP has been obtained from the acquisition unit 20, the placement unit 28 decides on an input item display 46, displays it on the display unit 16 as shown in FIG. 3, and allocates determination zone JA0 centered on the initial touch point TP and surrounding determination zones JA1 through JA4 as shown in FIG. 4 (S14). The placement unit 28 establishes the standard directions SD in addition to allocating the determination zones JA.

The correction unit 30 corrects the determination zones JA on the basis of the results of the determination unit 26. More specifically, results are obtained from the determination unit 26 indicating that the holding hand is the user's left hand (S16: Yes), the correction unit 30 rotates the determination zones JA to the right by the angle of rotation RA as shown in FIG. 8 (S18). When the size of the angle range is 90° and the number of surrounding determination zones JA is four as shown in FIG. 8, the angle of rotation RA is 22.5° according to the equation above. The correction unit 30 does not correct the standard directions SD. The correction unit 30 outputs information related to correction of the determination zones JA to the confirmation unit 32. The information related to the corrections is the angle of rotation RA and the direction of rotation for the determination zones JA.

When results are obtained from the determination unit 26 indicating that the holding hand is the user's right hand (S20: Yes), the correction unit 30 rotates the determination zones JA to the left by the angle of rotation RA as shown in FIG. 9 (S22). The correction unit 30 outputs the information related to the correction to the confirmation unit 32.

When results are obtained from the determination unit 26 indicating that the holding hand cannot be determined (S16: No, S20: No), the determination zones JA in FIG. 4 are not corrected.

The acquisition unit 20 determines whether or not the touch point TP has been moved on the basis of the position information on the touch point TP acquired from the touch panel 14 (S24). When it has been determined by the acquisition unit 20 that the touch point TP has moved as shown in FIG. 10 (S24: Yes), the position information for the current touch point TP is outputted to the detection unit 22, the placement unit 28, and the confirmation unit 32.

When position information for the initial touch point TP and the current touch point TP has been obtained from the acquisition unit 20, the detection unit 22 detects the movement direction of the touch point TP from the difference between the initial touch point TP and the current touch point TP (S26). The detection unit 22 outputs the detected direction of movement to the calculation unit 24.

The calculation unit 24 calculates the angle of deviation DA of the direction of movement obtained from the detection unit 22 relative to the standard directions SD (S28). When there are four standard directions SD as shown in FIG. 8, the calculation unit 24 calculates the angle of deviation DA of the direction of movement relative to the standard direction SD with the smallest angle relative to direction of movement. In the example shown in FIG. 10 and FIG. 11, the calculation unit 24 calculates the angle of deviation DA of the direction of movement relative to standard direction SD2. The angle of deviation DA is the size of the angle between the direction of movement and a standard direction SD, and does not have a positive or negative sign. Therefore, the angle of deviation DA is a value from 0° to 45°. The calculation unit 24 outputs the calculated angle of deviation DA to the correction unit 30.

The correction unit 30 corrects the input item display 46 in accordance with the results of the determination unit 26 (S32). More specifically, when the holding hand is the user's left hand, as shown in FIG. 10 and FIG. 11, the correction unit 30 rotates the input item display 46 to the right around the display reference point by the angle of deviation DA, and displays the rotated display on the display unit 16. As mentioned above, the angle of deviation DA is a value from 0° to 45°. Therefore, when the holding hand is the user's left hand, the correction unit 30 rotates the input item display 46 to the right around the display reference point at a value between 0° to 45° from the reference position shown in FIG. 3. When, as shown in FIG. 12, the angle between the direction of movement and standard direction SD2 is greater than 45°, the calculation unit 24 calculates the degree of deviation DA as the angle between the direction of movement and standard direction SD3. The correction unit 30 then rotates the display 46 to the right by the angle of deviation DA from the display 46 at the reference position shown in FIG. 3. In this way, as shown in FIG. 12 and FIG. 13, the angle between standard direction SD2 and a straight line connecting the display reference point to the center of input item "R" is the angle of deviation DA between the direction of movement and standard direction SD3. Here, the angle between the direction of movement to the right and reference direction SD2 is an angle from 0° to 90°, so the correction unit 30 gradually rotates the display 46 to the right as the angle changes from 0° to 45°, and then gradually rotates the display 46 to the left as the angle changes from 45° to 90°. When the holding hand is the user's right hand, the correction unit 30 rotates the input item display 46 to the left around the display reference point by the angle of deviation DA, and displays the rotated display on the display unit 16. Therefore, when the holding hand is the user's right hand, the correction unit 30 rotates the input item display 46 to the left around the display reference point at a value between 0° to 45° from the reference position shown in FIG. 3. The correction unit 30 outputs the information related to the correction of the input item display 46 to the confirmation unit 32.

The confirmation unit 32 determines which input item is currently being selected based on the position information of the touch point TP obtained from the acquisition unit 20 and from the current determination zone JA determined from the information related to the corrections obtained from the correction unit 30. If the distance of movement from the initial touch point TP is less than the radius of determination zone JA0 (S42: Yes), the confirmation unit 32 determines that input item "P" in the center determination zone JA0 has been selected (S44). If the distance of movement from the initial touch point TP is greater than or equal to the radius of determination zone JA0 (S42: No), the confirmation unit 32 determines that the input item in the surrounding determination zone JA in the direction of movement has been selected (S46). When a button for input item "P" has been established in the same determination zone JA0 as input item "P", the confirmation unit 32 may determine that input item "P" has been selected if the touch point is within the button for input item "P" displayed in the selection area 44. If outside the button for input item "P", the confirmation unit 32 may determine that the input item in a surrounding determination zone JA has been selected. The confirmation unit 32 displays the currently selected input item on the display unit 16 in a square. For example, as shown in FIG. 12, the movement direction of the touch point TP is near the border between input item "R" and adjacent input item "S" but within the determination zone JA2 for input item "R". In this situation, the confirmation unit 32 surrounds input item "R" with a square as shown in FIG. 13. Next, the user moves the touch point TP from the position shown in FIG. 12 into adjacent determination zone JA3 for input item "S" in the direction of movement as shown in FIG. 14. In this situation, the confirmation unit 32 determines that a boundary between determination zones JA has been crossed in the direction of movement, and eliminates the square surrounding input item "R" and surrounds input item "S" with a square as shown in FIG. 15.

Next, the acquisition unit 20 determines whether or not the touch point TP has been released (S48). When the user removes the finger from the touch panel 14, the acquisition unit 20 determines that the touch point TP has been released (S48: Yes), and outputs this information to the confirmation unit 32.

When the confirmation unit 32 receives information from the acquisition unit 20 indicating that the touch point TP has been released, the currently selected input item is confirmed and displayed in the input area 40 (S50).

When the acquisition unit 20 determines that the touch point TP has not been released (S48: No), the process is executed again beginning with Step S24.

When, in Step S24, the acquisition unit 20 has determined that the touch point TP has not moved (S24: No), Step S48 is executed.

In the information processing device 10, as described above, the correction unit 30 corrects the input item display 46 in accordance with the angle of deviation DA between the direction of movement of the touch point TP and a standard direction SD. In this way, the information processing device 10 can display the currently selected input item corresponding to the direction in which the user has moved the touch point TP. As a result, the input item the user is trying to select can be readily identified even when the direction of movement by the touch point TP deviates from a standard direction. This reduces the number of erroneously entered input items. In other words, the information processing device 10 provides a more user friendly interface. More specifically, the information processing device 10 can reduce the number of erroneous entries even when the device is held in one hand.

Because the correction unit 30 in the information processing device 10 rotates the input item display 46 within a narrow range from 0° to 45°, the user can intuitively select the alphanumeric character based on the position of the square surrounding the character even when the character cannot be viewed. When the angle of deviation DA in the information processing device 10 crosses 45° and the standard direction used to calculate the angle of deviation DA is changed, the direction of rotation of the input item display 46 is reversed by the correction unit 30. As a result, the user can easily recognize the boundary of a determination zone JA in the vicinity of a 45° angle of deviation DA.

In the information processing device 10, the correction unit 30 rotates and corrects the determination zones JA whether the information processing device 10 is being held in the user's left hand or right hand. Because this addresses the discrepancy in the movement direction relative to a standard direction SD caused by holding the device in the left or right hand, erroneous entries can be further reduced. Therefore, when the user is holding the information processing device 10 in one hand, the psychological burden on the user to move a finger in a standard direction SD is reduced, and excessive finger movement caused by this burden is also reduced.

The following is an explanation of a partially modified embodiment.

Figure 16:
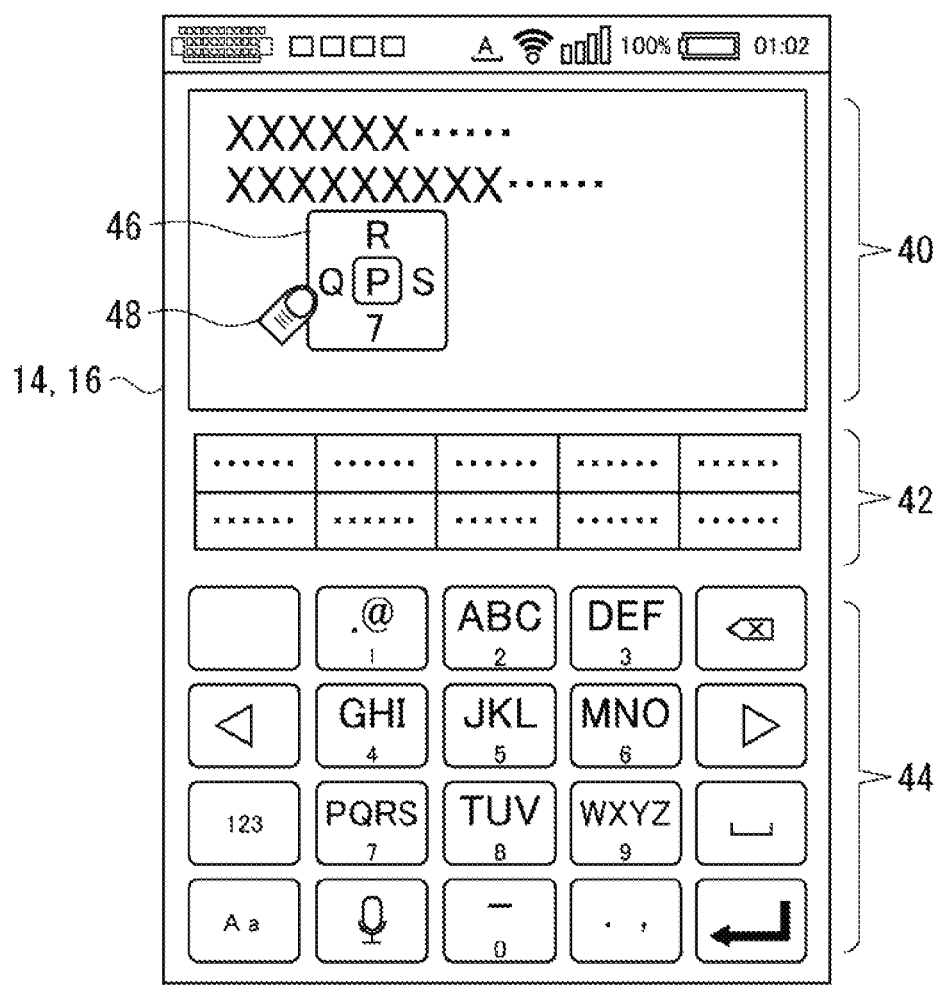
FIG. 16 is a diagram of the display showing the results determined by the determination unit 26.

FIG. 16 is a diagram of the display showing the results determined by the determination unit 26. The correction unit 30 may align the display showing the results of the determination unit 26 with the input item display 46. For example, when the results of the determination unit 26 indicate that the user's left hand is being used, the correction unit 30 may align a display 48 of the user's left thumb with the input item display 46. In this way, the information processing device 10 can inform the user which hand is currently being detected.

The touch panel 14 may cause a position indicated by a control signal to undulate when the control signal is received. For example, the touch panel 14 may have micro-sized pores formed in the front screen, and cause undulations controlled by pressure on the fluid (liquid or gas) filling the pores. Here, the correction unit 30 causes undulations on the touch panel 14 in response to the corrected placement of the determination zones JA. For example, the correction unit 30 may form a ridge along the boundaries between the corrected determination zones JA.

In the embodiments described above, the determination zones were rotated and corrected. However, the determination zones do not have to be corrected.

In the embodiments described above, alphanumeric characters were entered. However, other types of characters such as Japanese characters can be entered. Other input items can be entered as well.

In the embodiments described above, the determination unit 26 determined whether the left hand or the right hand was being used. However, the input item display 46 can be corrected, for example, rotated and corrected, in accordance with the angle of deviation without determining whether the left hand or the right hand is being used.

Figure 17:
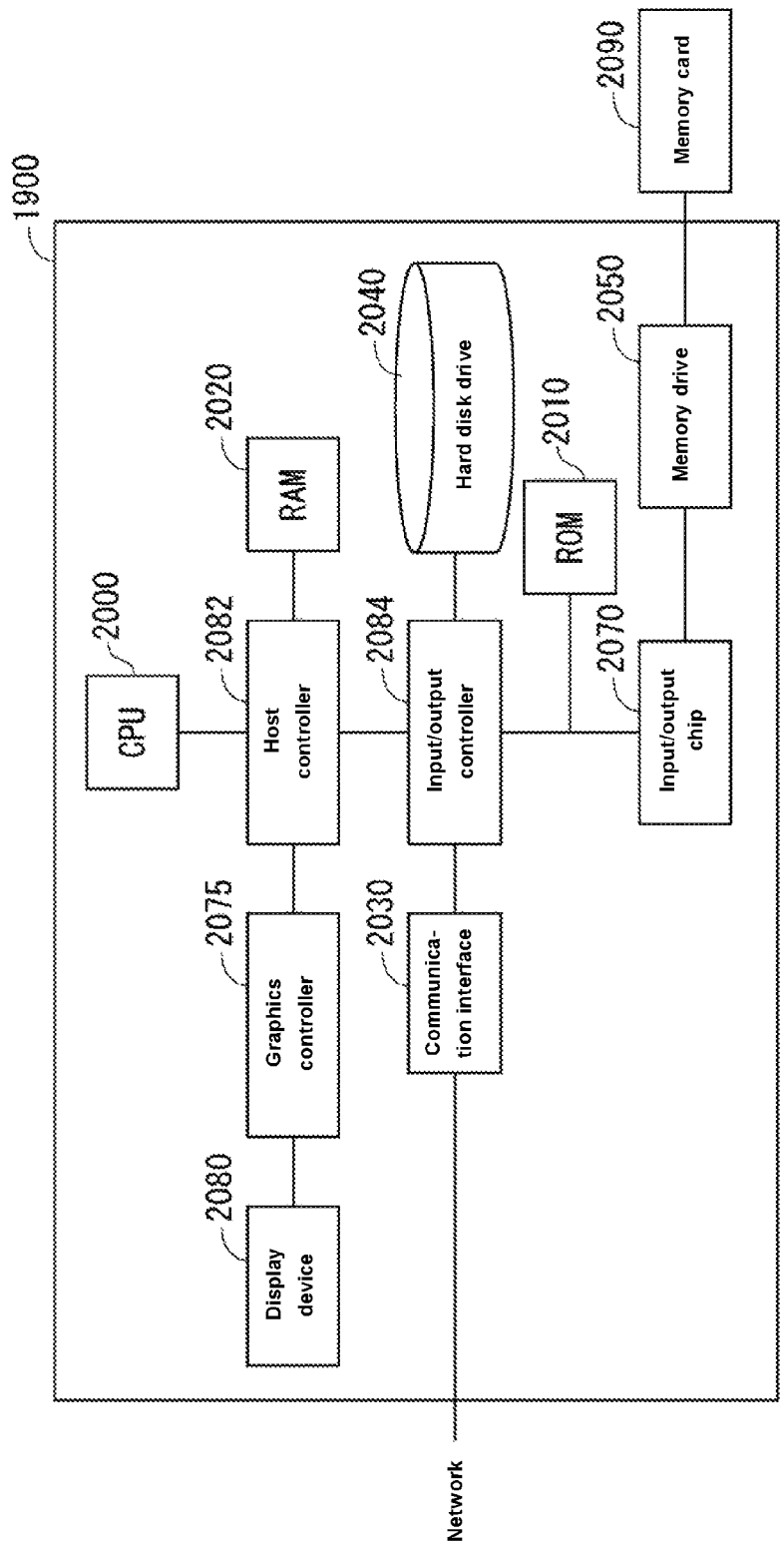
FIG. 17 shows an example of a hardware configuration for a computer 1900 related to the embodiment.

FIG. 17 shows an example of a hardware configuration for a computer 1900 related to the embodiment. The computer 1900 related to the present embodiment is an example of an information processing device 10. The computer 1900 is equipped with a CPU peripheral portion having a CPU 2000, RAM 2020, graphics controller 2075 and display device 2080 connected to each other by a host controller 2082, an input/output portion having a communication interface 2030, and a hard disk drive 2040 connected to the host controller 2082 by an input/output controller 2084, and a legacy input/output portion having a ROM 2010, memory drive 2050, and input/output chip 2070 connected to the input/output controller 2084.

The host controller 2082 is connected to RAM 2020, a CPU 2000 accessing the RAM 2020 at a high transfer rate, and a graphics controller 2075. The CPU 2000 is operated on the basis of a program stored in the ROM 2010 and the RAM 2020, and controls the various units. The graphics controller 2075 acquires the image data generated in the frame buffer of the RAM 2020 by the CPU 2000 and other units, and displays this image data on the display device 2080. Alternatively, the graphics controller 2075 can include a frame buffer for storing image data generated by the CPU 2000 and other units.

The input/output controller 2084 is connected to a host controller 2082, a communication interface 2030 serving as a relatively high-speed input/output device, and a hard disk drive 2040. The communication interface 2030 communicates with the other devices via a network. The hard disk drive 2040 stores the programs and data used by the CPU 2000 in the computer 1900.

The input/output controller 2084 is connected to the ROM 2010, the memory drive 2050, and the relatively low-speed input/output device of the input/output chip 2070. The ROM 2010 stores the boot program executed by the computer 1900 at startup and/or programs relying on hardware in the computer 1900. The memory drive 2050 reads programs or data from a memory card 2090, and provides the programs and data to the hard disk drive 2040 via the RAM 2020. The input/output chip 2070 connects the memory drive 2050 to the input/output controller 2084, and various types of input/output device are connected to the input/output controller 2084 via a parallel port, serial port, keyboard port, or mouse port, etc.

A program provided to the hard disk drive 2040 via the RAM 2020 is stored on a recording medium such as a memory card 2090 or an IC card provided by the user. A program is read from the recording medium, installed in the hard disk drive 2040 inside the computer 1900 via the RAM 2020, and executed by the CPU 2000.

Programs installed in the computer 1900 to enable the computer 1900 to function as an information processing device 10 include an acquisition module, detection module, calculation module, determination module, placement module, correction module, and confirmation module. These programs or modules work with the CPU 2000 and other components to cause the computer 1900 to function as the acquisition module, detection module, calculation module, determination module, placement module, correction module, and confirmation module.

The information processing steps written in these programs are specific means activated by reading the programs to the computer 1900 so that the software cooperates with the various types of hardware resources described above. These specific means function as the acquisition module, detection module, calculation module, determination module, placement module, correction module, and confirmation module. These specific means realize operations and the processing of information in the computer 1900 of the present embodiment to construct a dedicated information processing device 10 for the intended purpose.

For example, when the computer 1900 communicates with an external device, the CPU 2000 executes the communication program loaded in the RAM 2020, and instructs the communication interface 2030 in the communication processing on the basis of the processing content described in the communication program. The communication interface 2030 is controlled by the CPU 2000, and reads the transmitted data stored in the transmission buffer region of a memory device such as the RAM 2020, hard disk drive 2040, or memory card 2090, or writes reception data received from the network to a reception buffer region of the storage device. In this way, the communication interface 2030 exchanges data with a storage device using the direct memory access (DMA) method. Alternatively, the CPU 2000 may exchange data by retrieving data from the source storage device or communication interface 2030, and writing the data to the destination communication interface 2030 or storage device.

Also, the CPU 2000 writes all of the data or the necessary data to the RAM 2020 via, for example, a DMA transfer, from files or databases stored in an external storage device such as a hard disk drive 2040 or a memory drive 2050 (memory card 2090), and performs various types of processing on the data in the RAM 2020. The CPU 2000 then writes the processed data to an external storage device via, for example, a DMA transfer. Because the RAM 2020 temporarily stores the contents of the external storage device during this process, the RAM 2020 and the external storage device are generally referred to in the present embodiment as memory, a storage unit, or a storage device. The various types of information in the programs, data, tables and databases of the present embodiment are stored in these memory devices, and are the targets of information processing. The CPU 2000 can hold some of the RAM 2020 in cache memory, and read and write data to the cache memory. Here, the cache memory performs some of the functions of the RAM 2020. Therefore, this division is excluded in the present embodiment. Cache memory is included in the RAM 2020, the memory, and/or the storage device.

The CPU 2000 also performs various types of processing on data read from the RAM 2020 including the operations, processing, condition determination, and information retrieval and substitution described in the present embodiment and indicated by a sequence of instructions in the program, and writes the results to the RAM 2020. For example, when performing a condition determination, the CPU 2000 compares various types of variables described in the present embodiment to other variables or constants to determine whether or not conditions such as greater than, less than, equal to or greater than, equal to or less than or equal to have been satisfied. When a condition has been satisfied (or not satisfied), the process branches to a different sequence of instructions or calls up a subroutine. The CPU 2000 can also search files in a storage device or information stored in a database.

A program or module described above can be stored in a recording medium of an external unit. Instead of a memory card 2090, the recording medium can be an optical recording medium such as a DVD or CD, a magneto-optical recording medium such as MO, a tape medium, or a semiconductor memory such as an IC card. The recording medium can also be a storage device such as a hard disk or RAM provided in a server system connected to a dedicated communication network or the internet, and the program can be provided to the computer 1900 via the network.

The present invention was explained using an embodiment, but the technical scope of the present invention is not limited to the embodiment described above. The possibility of many changes and improvements to this embodiment should be apparent to those skilled in the art. Embodiments including these changes and improvements are within the technical scope of the present invention, as should be clear from the description of the claims.

The order of execution for operations, steps and processes in the devices, systems, programs and methods described in the claims, description and drawings was described using terms such as "previous" and "prior". However, these operations, steps and processes can be realized in any order as long as the output of the previous process is used by the subsequent process. The operational flow in the claims, description and drawing were explained using terms such as "first" and "next" for the sake of convenience. However, the operational flow does not necessarily have to be executed in this order.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for an information processing device receiving user selections inputted using a touch panel, the method comprising the steps of:

acquiring a touch point on the touch panel touched by the user;

placing, in an area surrounding a display reference point on a screen, a display of a plurality of input items capable of being inputted by the user by moving the touch point;

detecting a direction of movement by the touch point from an initial touch point of the user and a second touch point of the user, wherein the direction of movement comprises a line directed from the initial touch point to the second touch point;

calculating an angle of deviation between the direction of movement of the touch point by the user and a standard direction associated with a first input item of the plurality of input items, wherein the standard direction comprises a line intersecting the display reference point and bisecting the first input item; and correcting the placement of the display of the plurality of input items in accordance with the angle of deviation.

2. The method according to claim 1, wherein correcting the placement of the display of the plurality of input items in accordance with the angle of deviation comprises:

rotating the display of the plurality of input items around the display reference point in accordance with the angle of deviation.

3. The method according to claim 1 further comprising the steps of:

determining whether or not the screen has been touched by a left hand or a right hand of the user;

allocating, as determination zones for each of the plurality of input items, respective ranges of angles around the touch point, wherein respective ranges of angles do not overlap, and wherein respective ranges of angles each comprise an approximately equal angle size; and rotating and correcting the placement of the determination zones around the touch point on a basis of a result of determining whether or not the screen has been touched by the left hand or the right hand of the user.

4. The method according to claim 3, wherein rotating and correcting the placement of the determination zones comprises:

rotating the determination zones to the left when it has been determined that the user has touched the screen with the right hand, and rotating the determination zones to the right when it has been determined that the user has touched the screen with the left hand.

5. The method according to claim 3, wherein rotating and correcting the placement of the determination zones around the touch point comprises:

determining the angle of rotation for rotating the placement of the determination zones in accordance with the range of angles for the determination zones.

6. The method according to claim 3, wherein rotating and correcting the placement of the determination zones around the touch point comprises:

rotating the display of the plurality of input items to the left when it has been determined that the user has touched the screen with the right hand; and rotating the display of the plurality of input items to the right when it has been determined that the user has touched the screen with the left hand.

7. The method according to claim 1, further comprising:

rotating the display of the plurality of input items around the display reference point in accordance with the angle of deviation;

determining that the screen has been touched by a right hand of the user based on a vertical inclination of a finger touching the screen;

allocating as determination zones for each of the plurality of input items a respective portion of an area around the touch point, wherein respective areas around the touch point are defined by equally sized, non-overlapping angles;

rotating and correct the placement of the determination zones around the touch point, wherein the determination zones are rotated to the left based on determining that the screen has been touched by the right hand;

rotating the display of the plurality of input items to the left based on determining that the user has touched the screen with the right hand;

undulating a position indicated by a control signal when a control signal is received; and forming an undulation on the touch panel in accordance with the corrected placement of the determination zones, wherein the undulation comprises a ridge separating at least two determination zones, wherein the undulation is formed by selectively manipulating respective pressures of respective fluids in respective micro-pores in a front of the screen.

* * * * *